Nov. 21, 1950     R. A. JOHNSON     2,530,969
WELDING CLAMP
Filed July 21, 1948
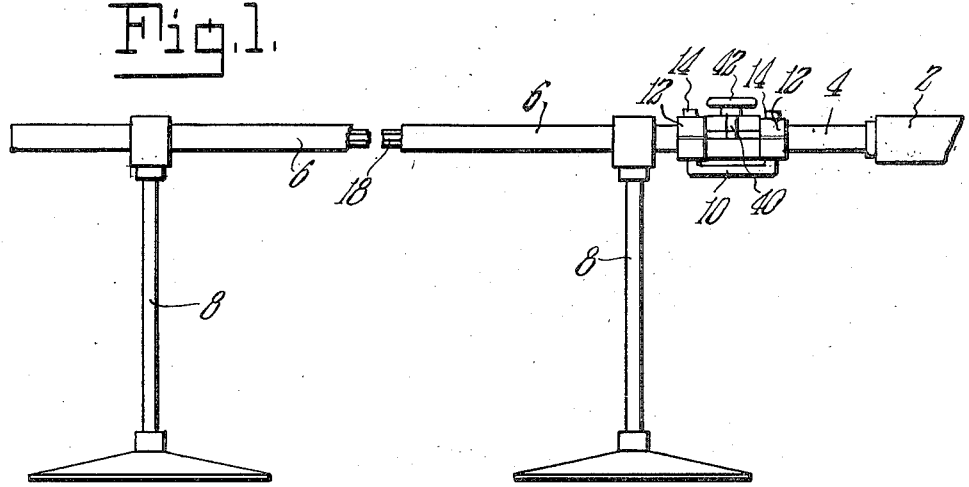
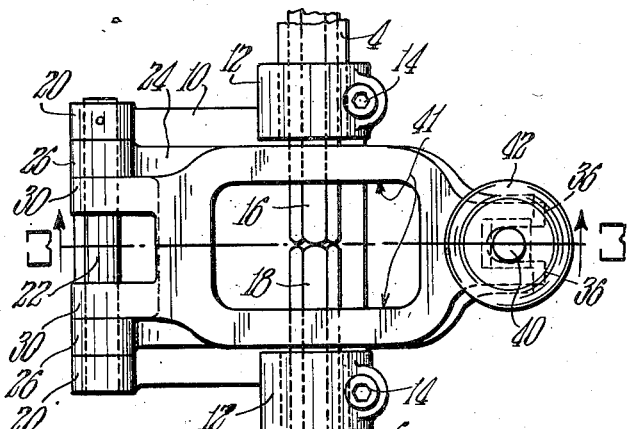
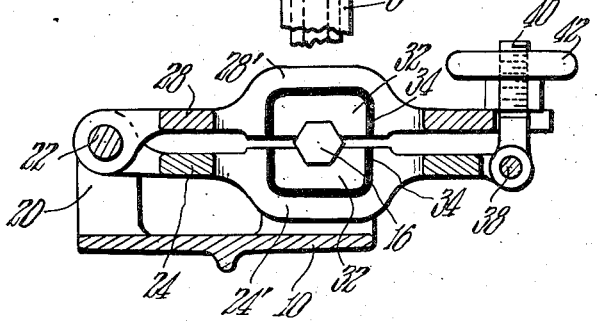
INVENTOR.
Robert A. Johnson.
BY Ross & Ross
Attys.

Patented Nov. 21, 1950

2,530,969

UNITED STATES PATENT OFFICE 2,530,969

WELDING CLAMP

Robert A. Johnson, Longmeadow, Mass.; Effie B. Johnson, executrix of said Robert A. Johnson, deceased, assignor to Westfield Metal Products Co., Inc., a corporation of Massachusetts Application July 21, 1948, Serial No. 39,864

2 Claims. (Cl. 113—102)

The principal object of the invention is directed to the provision of an apparatus for connecting together lengths of bar stock so as to supply a bar stock machine with a continuous length of stock.

It is well known that machines, herein referred to as bar stock machines, automatically form and cut successive pieces of work from the inner end of lengths of bar stock.

As the bar is consumed, it is necessary to insert a new length of stock in the stock tube at the rear of the machine. This frequently entails stopping of the machine and often adjustments are necessary, all of which are time consuming and seriously affects production among other objections.

According to this invention an apparatus is provided whereby the forward end of a new length of stock is secured to the rear end of a bar which is being consumed to the end that a bar stock machine is supplied with a continuous bar of stock.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a more or less diagrammatic elevational view of the rear end of a bar stock machine and bar tube having the novel features of the invention associated therewith;

Fig. 2 is a plan view of apparatus embodying the novel features of the invention; and Fig. 3 is a sectional elevational view on the line 3—3 of Fig. 2.

Referring now to the drawings more in detail, the invention will be fully described.

The rear end of a bar stock machine is represented by 2 which has an inner bar tube 4 extending rearwardly therefrom. The bar stock machine may take any form. An outer bar tube 6 is supported by one or more stands 8.

A support 10 is provided which has spaced hubs 12 in which spaced adjacent ends of the tubes 4 and 6 are clamped by screws 14 or the like.

The outer end of a bar of stock being consumed by the bar stock machine is represented by 16 in the tube 4 and the forward end 18 of a new length of stock is shown in the tube 6.

Adjacent ends of the bars 16 and 18 may be chamfered or otherwise shaped all as may be desired.

Lugs 20 extending upwardly from support 10 have a journal shaft 22 fixed therein in any desired manner.

A lower clamp member 24 has ears 26 journalled on shaft 22 and an upper clamp 28 has ears 30 journalled on said shaft.

Intermediate portions 24' and 28' of the clamps carry jaws 32 which may be of metal and they may be insulated from the clamp by insulation 34 as may be desired.

The outer end of clamp 24 has spaced ears 36 which carry a pintle 38 and a clamp bolt 40 has its lower end journalled thereon. The clamp bolt 40 is threaded and has a wheel 42 in engagement therewith.

The outer end of the upper clamp is provided with a slot, as shown, to receive the screw 40. The clamp members 24 and 28 are provided with central openings 41 to facilitate free access to the ends of the bars, as will be seen in Fig. 2.

The jaws 32 have longitudinal seats to reasonably snugly receive and embrace the ends 16 and 18 of the bars.

In the form of the invention shown, the bars 16 and 18 are hexagonal in cross section and the seats in the jaws are complemental thereto so that the longitudinal faces and corners of the bars are held in alignment when clamped by the clamping mechanism.

The member 42 bearing on the upper clamp 28 is tightened on the upper clamp so that the bars are clamped between the seats of the clamp with the extremities thereof in close adjacency for joining.

With the ends of the bars held as described and shown, said ends are secured together by means of heat or the like such as acetylene welding, electric welding, brazing or the like.

By securing the leading end of a new bar to the rear end of a bar being consumed, a machine operating on bar stock is continuously supplied with stock thereby to obtain all the advantages thereof.

Bars of various cross sectional shapes may be employed, the jaws may be arranged to hold and align adjacent ends of bars for the carrying out of the invention.

It is intended that the ends of the bars be joined substantially instantaneously and may be readily accomplished by electro-welding or the like, thereby to facilitate the continuous operation of the bar stock machine.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus for holding adjacent ends of a aligned bars of stock in bar supporting tubes in adjacency for welding comprising in combination, a support having spaced bosses provided with aligned openings therein, means for securing said tubes in said openings with adjacent ends in spaced relation to expose therebetween adjacent inner ends of bars to be welded, upper and lower clamp members having rear ends pivotally connected to said support at one side of the longitudinal axis of said tubes for swinging movements between said bosses and to and from open and closed positions, upper spaced apart jaw members carried by the upper clamp member and lower jaw members carried by the lower clamp member cooperating therewith to clamp adjacent inner ends of bars in said tubes when the clamp members are in closed position, and engageable means for securing the clamp members in closed position disposed at forward ends thereof, said jaw members being disposed on said clamp members so as to be adjacent the inner sides of said bosses when the clamp members are in closed position.

2. Apparatus for holding adjacent ends of aligned bars of stock in bar supporting tubes in adjacency for welding comprising in combination, a support having spaced bosses provided with aligned openings therein, means for securing said tubes in said openings with adjacent ends in spaced relation to expose therebetween adjacent inner ends of bars to be welded, upper and lower clamp members having rear ends pivotally connected to said support at one side of the longitudinal axis of said tubes for swinging movements between said bosses and to and from open and closed positions, upper spaced apart jaw members carried by the upper clamp member and lower jaw members carried by the lower clamp member cooperating therewith to clamp adjacent inner ends of bars in said tubes when the clamp members are in closed position, and engageable means for securing the clamp members in closed position disposed at forward ends thereof, said jaw members being disposed on said clamp members so as to be adjacent the inner sides of said bosses when the clamp members are in closed position, said clamp members being provided with openings disposed between the jaw members thereof.

ROBERT A. JOHNSON.

REFERENCES CITED

The following references are of record in the file of this patent:

UNITED STATES PATENTS

| Number | Name | Date |
|---|---|---|
| 801,222 | Corcoran | Oct. 10, 1905 |
| 883,869 | Fortin | Apr. 7, 1908 |
| 1,884,144 | Norquist | Oct. 25, 1932 |
| 2,175,974 | Shurtz | Oct. 10, 1939 |
| 2,308,340 | Newlon | Jan. 12, 1943 |
| 2,363,828 | Anderson | Nov. 28, 1944 |
| 2,381,584 | Fulleton | Aug. 7, 1945 |
| 2,414,874 | Herbst | Jan. 28, 1947 |